June 1, 1965

J. HRDINA 3,186,434

DEVICE FOR THE CENTRAL DISTRIBUTION OF
LIQUIDS AND GASES, PARTICULARLY IN THE
COURSE OF SEPARATION PROCESSES

Filed July 31, 1962

3 Sheets-Sheet 1

INVENTOR.
JIŘÍ HRDINA
BY
Attorney

June 1, 1965  J. HRDINA  3,186,434
DEVICE FOR THE CENTRAL DISTRIBUTION OF
LIQUIDS AND GASES, PARTICULARLY IN THE
COURSE OF SEPARATION PROCESSES
Filed July 31, 1962  3 Sheets-Sheet 2

INVENTOR.
JIŘÍ HRDINA
BY
Attorney

Inventor
JIRI HRDINA

United States Patent Office 3,186,434
Patented June 1, 1965

3,186,434
DEVICE FOR THE CENTRAL DISTRIBUTION OF LIQUIDS AND GASES, PARTICULARLY IN THE COURSE OF SEPARATION PROCESSES
Jiří Hrdina, Prague, Czechoslovakia, assignor to Ceskoslovenská akademie věd, Prague, Czechoslovakia, a corporation of Czechoslovakia
Filed July 31, 1962, Ser. No. 213,808
Claims priority, application Czechoslovakia, Aug. 7, 1961, 4,852/61
3 Claims. (Cl. 137—625.11)

The present invention relates to a device for the central distribution of liquids and gases, particularly in the course of separation processes, for analytical and preparative purposes.

A device of this type, a so-called central distributor, is intended for box-type receptors which serve for accumulating and storing of fractions or for their suitable disposition or location, with the object of successive tapping, such as carried out in a cooled, or in a fully isolated or sterilised space, or in a space geometrically confined to a required shape, or in a space only slightly larger than the total volume of all accumulated fractions etc.

Each of the vessels has its own junction member, by which it is connected to the respective part of the central distributor according to the invention, and which is arranged in any required position near the box. It is the purpose of the central distributor to successively join one central supply or discharge capillary tube to the supply lines leading to the various vessels in the box.

According to the main feature of the invention the central distributor comprises two spindles connected together by means of a coupling, one of the spindles being stationary while the other is rotatable and both are provided with a co-axial bore, the rotatable spindle carrying an arm equipped with a distributor mechanism which on the one hand is connected to the bore and on the other hand bears on distributor openings provided in a plate. A gear wheel or a ratchet wheel serves for imparting rotary movement to the spindle.

Figure 1:
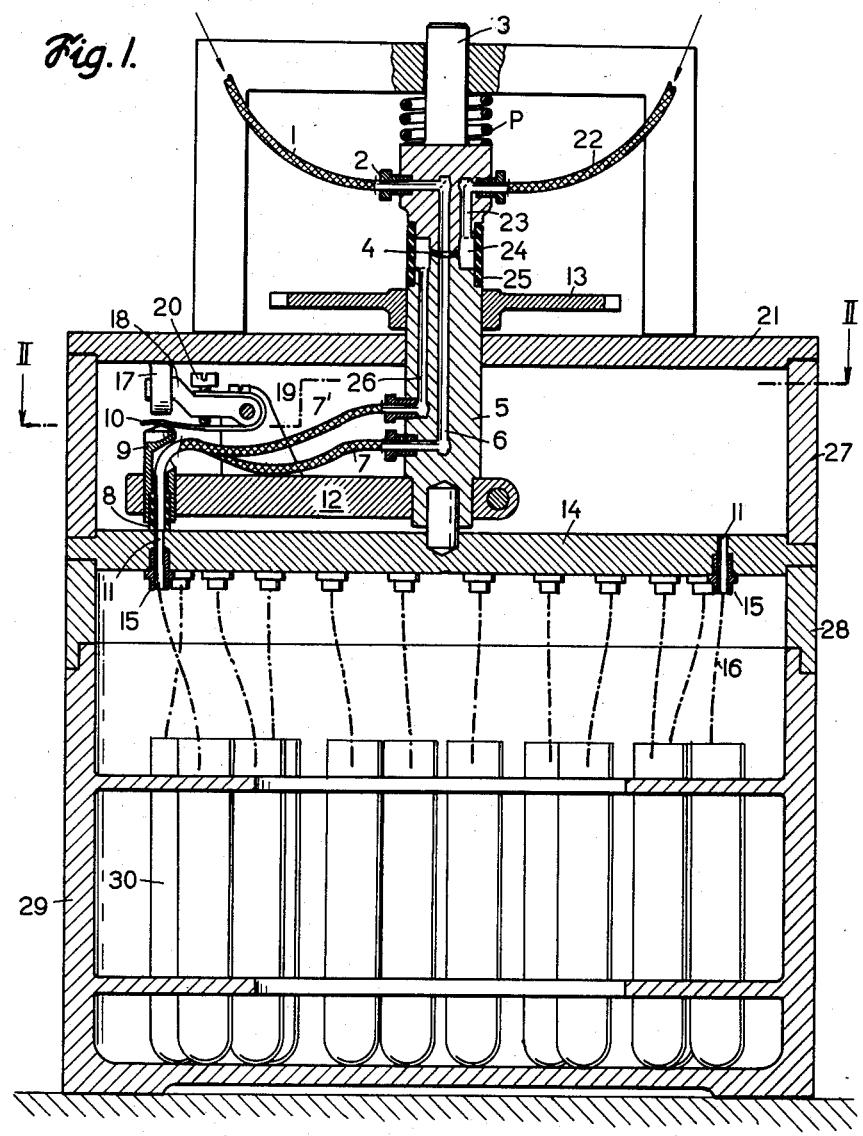
Figure 2:
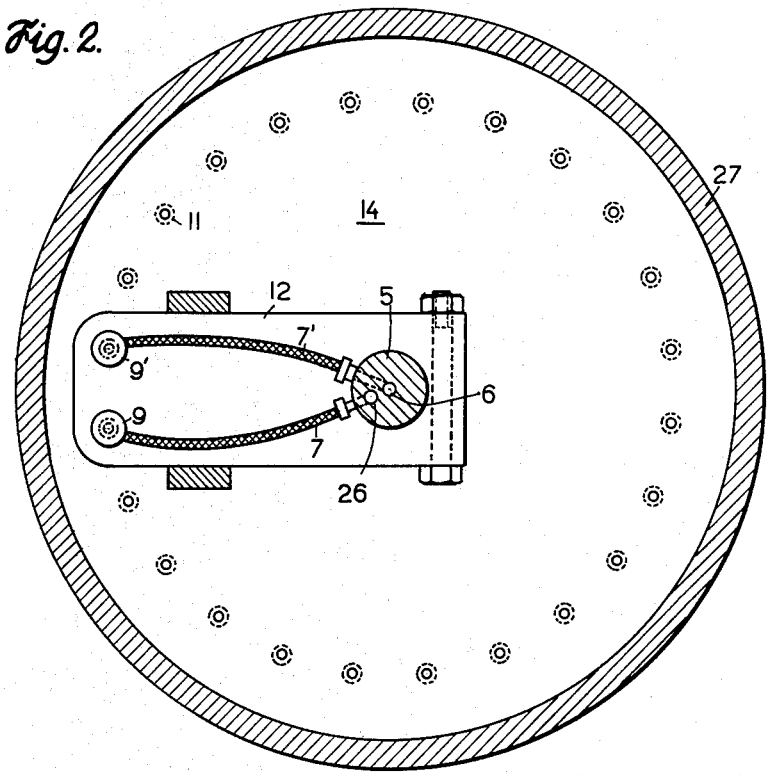
Figure 3:
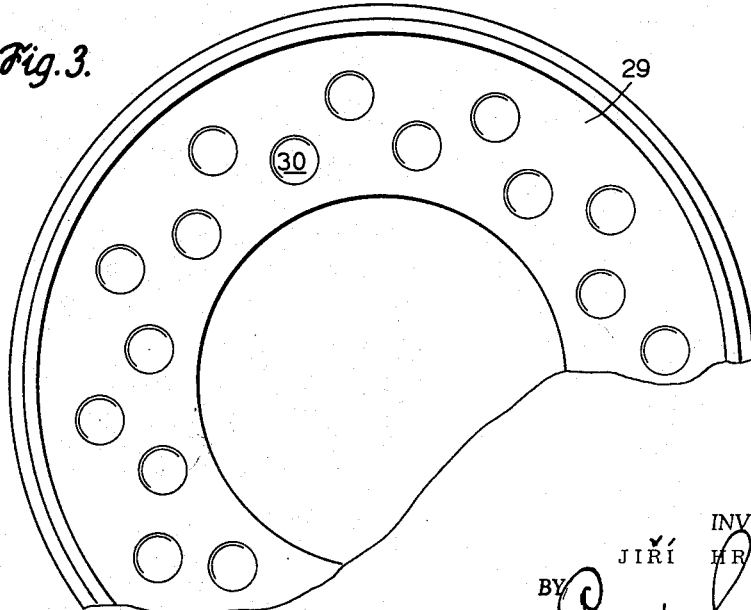
Figure 4:
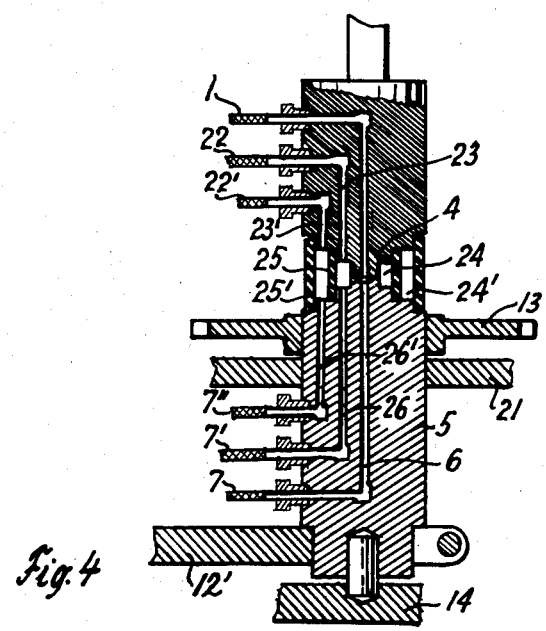

The novel feature of the invention including various novel details of construction and combination of parts will now be more particularly described with reference to the accompanying drawings in which FIG. 1 shows the general disposition of the apparatus in an elevational cross sectional view, FIG. 2 is a cross sectional view taken along the line II—II of FIG. 1, FIG. 3 is a plan view of the box 29 with inserted test tubes or vessels, FIG. 4 is an elevational view partly in section of a modification of the apparatus shown in FIGS. 1–3, and FIG. 5 is a plan view of a portion of the modification shown in FIG. 4.

A supply hose 1 is joined to a bore 2 located in the stationary part 3 of a spindle which, over a coupling or bearing 4, is pressed with a force P against the rotating part 5 of the spindle. A bore 6 in the rotating part 5 of the spindle is connected to a hose 7 attached to a slidable sealing member or distributing head 8 which is fixed in a cylindrical guide 9, a spring 10 pressing said roller resiliently against a base plate 14 of the distributor. The base plate is provided with the required number of bores 11, arranged in a circle around the axis of the spindle. The slidable sealing member 8 and thereby the entire pipping, as described above, is successively attached to said bores 11 during subsequent operational steps carried out by the rotary arm 12, which rotates along with the part 5 of the spindle by means of a ratchet wheel or gear wheel 13 whose teeth are engaged by "pawls" (not shown) driven by a suitable mechanism comprising cams responding to various impulses emitted by a control device. A required number of hoses 16 lead through plugs 15 from the various bores 11 provided in the base plate 14 to the various locations where the junction member is to be successively connected, for instance, to the necks of vessels or test tubes 30 placed in the respective box of the fraction receptor.

The pressure force exerted by the slidable sealing distributing head 8 upon the plate 14 is preferably produced by a roller 17 rotatably mounted in a lever 18 which is pivoted by means of a joint 19 to the rotatable arm 12. The roller 17 imparts tension to a spring 10 in a degree adjustable by means of a set screw 20 to the required value. If the point of contact of the roller 17 with the top plate 21 of the distributor lies approximately in the extended axis of the sliding sealing member or distributing head 8 or of its cylindrical guiding member 9, no substantial component of the pressure force is transmitted to the arm 12, with the result that neither the arm nor the spindle 5 or its bearings (which in some instances are preferably carried out as sealed bearings) are unnecessarily exposed to strain by lateral forces, The only forces transferred by the rotary system to the sliding seal are the forces required for the lateral displacement of member 8 along the plate 14. The force P acting from above suffices just for the required contact of the bearing 4, which is preferably made of a material with a relatively low elasticity modulus and low coefficient of friction, for instance a material known under the trade name of Teflon. Likewise, the sealed bearing (not shown) of the part 5 of the spindle in the top plate 21 can preferably be made of Teflon or a similar material.

If the distributor is required to effect connection between the respective locations and also one or more pipings, this may be achieved preferably in a manner shown in the drawing, i.e. by connecting a further inlet hose 22 over a bore 23 and annular space 24, sealed to the outside by a ring 25 made for instance of a suitably resilient plastic. A closed annular junction with a bore 26 in the movable part 5 of the spindle is thus produced, the bore 26 leading to a similar outlet which connects said bore to a similar sliding seal as disclosed in connection with the preceding example, wherein the junction is formed by a hose 7 and guide member 9. It will be appreciated, that upon stepwise movement of the ratchet wheel 13 with suitably chosen pitches of bores 11, not only the first communication system but also the second and possible further ones successively reach positions in which an operative connection is established, it being understood that the second and possibly further communication system would be attached by means of similar bores and further annular spaces and further sliding seals. In this instance the rotary arm would carry at least one further distribution mechanism and the pressure spring would be divided into at least two tongues, each of which bears against the respective distribution mechanism.

Figure 5:
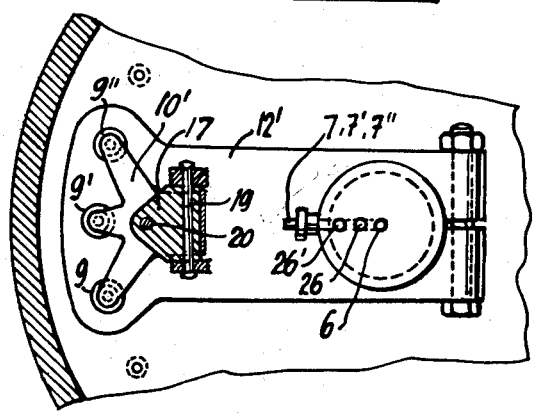

Thus, in FIGS. 4 and 5, it is seen that there may be readily employed in accordance with the principles of the invention three hoses 7, 7' and 7", bores 26 and 26', inlet hoses 22 and 22', resilient rings 25 and 25', bores 23 and 23', annular spaces 24 and 24', cylindrical guides 9, 9' and 9". Rotary arm 12' in FIGS. 4 and 5 corresponds to rotary arm 12 in FIGS. 1 and 2.

Such further junctions may serve for successive admission of further liquids or gases to the same working locations. The use of gas or air may be of advantage for blowing-through the hoses 16 in order to immediately remove the liquid which may have remained in the hoses 16 due to capillary forces into the respective vessels. This operation is carried out immediately after the hydraulic connection has been terminated. Such blowing action can, in some instances, be of decisive importance, for instance where small amounts of liquid to be conveyed with analytical precision are concerned and it is advisable to effect such plowing action with a limited amount of air which just suffices for the purpose and does not unnecessarily remove vapors which would happen if the air or gas stream were continuous. With the aforesaid objective in view, the piping 22 can be connected to a small blower, which, however, does not form part of the present invention. Suitable cam drives may be arranged by means of which the operation of the blower can, as to its working phase, be brought in accord with the stepwise movement of the rotatable distribution arm.

In other instances, however, a larger amount of gas may have to supplied, for instance to cause the gas to bubble through the liquid, thereby mixing it thoroughly. The hoses, in this case, must extend sufficiently deeply into the respective vessels. This is a condition of proper operation, when the central distributor has to be used for a reversed process, i.e. to suck off a certain part of the entire amount of liquid from the various vessels into the piping, by means of which the central distributor is connected to other parts of the apparatus. In this way the gradual transfer of the content of various vessels for centralised treatment may be effected by a continuous method. The latter arrangement enables further a temporary drawing-in of the entire content or of the content of various vessels or parts thereof, e.g. to a measuring device, such as a photometric instrument, from which, after the measuring operation, the whole amount is returned to the original vessel. A residue, if any, retained by capillary forces may be conveyed in the aforementioned manner. Finally, the latter arrangement may serve for pumping the entire or partial contents of the various vessels into other vessels, provided in the same or in another box.

It will be understood from the accompanying drawing, that the illustrated arrangement of the distributor enables the same to be easily and completely closed by side walls 28, and if required, to be closely connected to the box 29. A complete and, if necessary, sterile closure of the entire receptor system including the distributor in relation to the ambient space can easily be effected.

I claim:

1. A device for distributing gaseous or liquid material into stationary held and substantially equally spaced collecting vessels in substantially circular arrangement comprising in combination a base plate having a plurality of equally spaced and circularly arranged distribution openings; a top plate above said base plate; a vertical spindle located centrally of said circularly arranged distribution openings; said spindle including a lower spindle portion rotatable in equal steps, a stationary upper portion, bearing means for the abutting ends of said spindle portions and spring means holding said abutting end in tight contact; a closed annular space surrounding the abutting ends of the spindle portions; said rotational steps conforming to the spacing of said distribution openings; a first central axial boring within said spindle having its upper inlet end in the stationary spindle portion and its lower outlet end in the rotatable spindle portion; at least a second boring extending within the axial direction of the stationary spindle portion and entering with its lower end into said annular space; at least a third boring extending within and in the axial direction of the rotatable spindle portion and communicating at its upper inlet end with said annular space; a first tube line feeding material to be distributed to said inlet end; a second tube line connected with one end to said outlet end; a third tube line feeding material into the upper end of said second boring; a fourth tube line connected with one end to the lower outlet end of said third boring; a distribution arm attached to the stepwise rotatable lower spindle portion; a first distributing head attached to the other end of said second tube line and adjustably mounted in said distribution arm in operative relation to said distribution opening of the base plate; means holding said first distribution head in sliding tight contact with the base plate; a second distributing head attached to the other end of said fourth tube line and adjustably mounted in the distribution arm in spaced relation to said second distributing head and in operational relation to said distribution openings; and means holding said second distributing head in sliding tight contact with said base plate.

2. A device for distributing gaseous or liquid material into stationary held and substantially equally spaced collecting vessels in substantially circular arrangement, comprising in combination a base plate having a plurality of equally spaced and circularly arranged distribution openings; a top plate above said base plate; a vertical spindle located centrally of said circularly arranged distribution openings; said spindle including a lower spindle portion rotatable in equal steps; a stationary upper portion, bearing means for the abutting ends of said spindle portions and spring means holding said abutting ends in tight contact; said rotational steps conforming to the spacing of said distribution openings; a central axial boring within said spindle having its upper inlet end in the stationary spindle portion and its lower outlet end in the rotatable spindle portion; a first tube line feeding material to be distributed to said inlet end and a second tube line connected with one end to said outlet end; a distribution arm attached of the stepwise rotatable lower spindle portion; a distributing head attached to the other end of said second tube line and adjustably mounted in said distribution arm in operative relation to said distribution openings of said base plate; and means holding the distribution head in sliding tight contact with the base plate, said last named means comprising a lever tiltably mounted with one end on the distribution arm between the same and the top plate and extending radially to said spindle; a roller mounted on the other end of said lever for circular movement around the spindle; and adjustable spring means connected to said lever and operatively interposed between the same and the distribution head to press the latter tightly against the base plate for cooperation with the distribution openings and the roller against the top plate.

3. A distributing device according to claim 1 wherein said means acting upon the two distribution heads are consolidated.

References Cited by the Examiner

UNITED STATES PATENTS

| 2,204,276 | 6/40 | Lass | 137—625.11 XR |
| 2,226,169 | 12/40 | Koehler | 137—625.11 |
| 2,565,818 | 8/51 | Kooken | 137—625.11 |
| 2,964,061 | 12/60 | Rawson et al. | 137—625.11 XR |
| 2,979,451 | 4/61 | Pettinger | 137—625.11 XR |

M. CARY NELSON, *Primary Examiner.*

MILTON KAUFMAN, MARTIN P. SCHWADRON, *Examiners.*